United States Patent
Colgan et al.

(10) Patent No.: US 6,781,650 B1
(45) Date of Patent: Aug. 24, 2004

(54) LIQUID CRYSTAL LIGHT VALVE AND METHOD FOR PRODUCING SAME, AND LIQUID CRYSTAL PROJECTION DISPLAY DEVICE

(75) Inventors: Evan George Colgan, Chestnut Ridge, NY (US); Masami Shinohara, Shiga-ken (JP); Mitsuru Uda, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 09/662,192

(22) Filed: Sep. 14, 2000

(30) Foreign Application Priority Data

Sep. 17, 1999 (JP) ............................................ 11-264403

(51) Int. Cl.[7] ............................................ G02F 1/1335
(52) U.S. Cl. ............................................ 349/110; 349/5
(58) Field of Search ...................................... 349/5, 110

(56) References Cited

U.S. PATENT DOCUMENTS 5,056,895 A * 10/1991 Kahn ........................... 349/114
6,081,305 A * 6/2000 Sato et al. ..................... 349/5

FOREIGN PATENT DOCUMENTS

| JP | 8-328034 | 12/1996 |
| JP | 9-33952 | 2/1997 |
| JP | PUPA10-010569 | 1/1998 |

* cited by examiner

Primary Examiner—Robert H. Kim
Assistant Examiner—P. R. Akkapeddi
(74) Attorney, Agent, or Firm—Robert M. Trepp

(57) ABSTRACT

Incident light from the space between the light-reflecting films in a liquid crystal light valve of a liquid crystal display device, especially in a reflection-type liquid crystal light valve of a projection-type liquid crystal display device is effectively blocked. The liquid crystal light valve having a semiconductor substrate, a counter substrate, light-reflecting films, and liquid crystal comprises a light-blocking layer and light shields formed between the light-blocking layer and the light-reflecting films.

38 Claims, 14 Drawing Sheets

US 6,781,650 B1

LIQUID CRYSTAL LIGHT VALVE AND METHOD FOR PRODUCING SAME, AND LIQUID CRYSTAL PROJECTION DISPLAY DEVICE

BACKGROUND OF THE INVENTION

1. Field of the Invention

The present invention relates to a liquid crystal display device and a method for producing the same. More particularly, it relates to a reflection-type liquid crystal light valve for a liquid crystal projection display device.

2. Description of the Related Art

Recently, a super high definition active matrix projection LCD (liquid crystal display) has attracted widespread attention for its ability to meet high definition and large-screen display requirements and its potential to replace CRTs (cathode ray tubes). Generally, an active matrix LCD comprises: a semiconductor substrate on which switching elements and display electrodes connected to the switching elements are formed; and a counter substrate on which counter electrodes are formed above the semiconductor substrate, where a liquid crystal fills the region between the semiconductor substrate and the counter substrate (the cell gap).

A projection LCD device comprises a light source, a light valve, a screen, an optical filter, and a projection lens. There are two types of light valves which are used for the LCD device. One is a transmission-type liquid crystal light valve for projecting an image on a screen by letting in the light from the light source, and the other is a reflection-type liquid crystal light valve for projecting an image on the screen by reflecting the light from the light source.

FIG. 11 is a schematic sectional view of one example of a reflection-type liquid crystal light valve. As shown in FIG. 11, the reflection-type liquid crystal light valve 200 has: a transistor 204 formed in a semiconductor substrate 202; a counter substrate 206 provided on a light-incident side; a plurality of light-reflecting films 210 connected electrically to the semiconductor substrate with a space 208 therebetween; and liquid crystal 212 filled in a cell gap between the light-reflecting films and the counter substrate. Over the transistor 204, a light-reflecting film 210 which acts as a reflecting electrode is formed on an interlayer insulating layer 214 and the like. The liquid crystal 212 is filled in a cell gap between these light-reflecting films 210 (which films act as reflecting electrodes), and the counter substrate 206 consisting of a counter electrode 216 and a glass cover plate 218. The light-reflecting films 210 which act as reflecting electrodes are formed for each pixel region including each transistor 204. Between mutually adjacent light-reflecting films 210, a space 208 is formed. In such a liquid crystal light valve, a voltage between the light-reflecting films 210 and the counter electrode 216 is controlled in accordance with a display signal, and thereby an array of the liquid crystal 212 placed therebetween is properly controlled.

In the case of a reflection-type liquid crystal light valve, incident light passes through the space between the reflecting electrodes and is transmitted into the interlayer insulating layer, and then propagates through the interlayer insulating layer by multipath reflections. When this light comes near the transistor, it causes a leakage current as a result of the photoconductive effect, and thus degrades the contrast of the LCD. The photoconductive effect becomes more pronounced as the patterning of pixels becomes finer. Therefore, like the LCD light valve 200 shown in FIG. 11, a liquid crystal light valve is generally provided with a light-blocking layer 220 and an insulating layer 222 formed on the light-blocking layer 220 in order to avoid the above-mentioned photoconductive effect and to block the incident light.

In various steps of forming the above-mentioned semiconductor substrate, residual reactive products generated in the deposition process used, such as a CVD (Chemical Vapor Deposition) process, and foreign particles such as metal powders and organic pieces generated in the course of the operation of an apparatus, may all be left and deposited in the apparatus, adhering to the surface of the substrate. For example, foreign particles may be generated during a photolithographic process and adhere to a surface of a resist layer or a metal layer. FIG. 12(a) shows a case where a foreign particle 230 adheres to an insulating layer 214 in the liquid crystal light valve. If the light-blocking layer 220 is formed on the insulating layer 214 with a foreign particle thereon, a protrusion is formed on its surface as shown in FIG. 12(b), and thus the smoothness of the surface is spoiled. As a result, the insulating layer 222 formed on the light-blocking layer 220 is substantially thinned near the foreign particle, and therefore insulation between the light-blocking layer 220 and the reflecting electrode 210 cannot be assured.

However, there is a method to keep the insulation. In that method, after the light-blocking layer 220 is formed, the protrusion including a foreign particle is removed by a physical method such as CMP (chemical mechanical polish) to flatten the surface of the light-blocking layer 220, and then the insulating layer 222 is formed on the light-blocking layer 220, as shown in FIG. 12(c).

However, since the light-blocking layer itself is also removed by this method, an underlying transistor fails to work properly due to incident light, and thus pixel failure occurs. More specifically, since the light shield and light-reflecting electrode are formed almost all over the semiconductor substrate, the foreign particle causes a short circuit between the light-blocking layer and a reflecting electrode or light leakage causes the malfunction of a transistor, which leads to the pixel failure.

Published Japanese Patent Application No. 8-328034 discloses a liquid crystal light valve comprising a plurality of light-blocking layers to inhibit a leakage current due to the photoconductive effect. For example, as shown in FIG. 13, two metal layers 304 and 306 are formed by sandwiching the insulating layer 222 therebetween, so that they can shield the surface of the semiconductor substrate from the light incident from a space 208 between the reflecting electrodes 210. These metal layers 304 and 306 are each provided with a slit 308. Since these slits 308 are staggered, the incident light is reflected by either of metal layers 304 or 306, so that it cannot reach the semiconductor substrate.

As the number of light-blocking layers such as metal layers 304 and 306 increases, more shielding effects are produced. However, since a step of forming the metal layer 304 or 306 has to be repeated, the process becomes more complicated and increases in number, which leads to higher manufacturing costs.

Published Japanese Patent Application No. 9-33952 discloses a liquid crystal light valve 400 shown in FIG. 14, which can solve the above problems. In this liquid crystal light valve 400, the space 402 between the light-reflecting films 210 (reflecting electrodes) are filled with a light-blocking insulating layer 404 consisting of two color resists selected from red, blue, and green. The light of wavelengths in a specific region may pass though the space 402 between the light-reflecting films 210, however, the light is completely blocked by the light-blocking insulation layer 404 before it reaches an MOS (Metal Oxide Semiconductor) transistor and thus the leakage current can be prevented. The light-reflecting films 210 of the liquid crystal light valve described in the above patent application should be thick enough to form two colored resist layers of uniform thickness, however, it may often cause a problem in terms of the formation of thinner layers.

Moreover, as the demand for higher definition and higher production efficiency increases, the simplification of processes, the reduction of power consumption of pixels, and high-speed operation are always required in the process of forming a liquid crystal light valve.

SUMMARY OF THE INVENTION

Accordingly, it is an object of the present invention to provide a light-reflection type liquid crystal light valve for a projection type liquid crystal display device, which can prevent an underlying transistor from malfunctioning due to a leakage of light incident from a light source.

Another object of the present invention is to provide a liquid crystal light valve capable of preventing shorts between a light-blocking layer and a reflecting electrode, which is caused by a foreign particle.

Still another object of the present invention is to achieve a simple process for manufacturing a semiconductor substrate of a liquid crystal light valve, low power consumption, and higher-speed operation by utilizing an electric capacitance obtained by the formation of a light-blocking layer.

The above and other objects of the present invention are achieved by a liquid crystal light valve according to the present invention having:

a plurality of light-reflecting films with a space therebetween;

a semiconductor substrate connected electrically to the light-reflecting films;

a counter substrate provided on the incident-light side;

liquid crystal filled in a cell gap between the light-reflecting films and the counter substrate;

an electric circuit formed in the semiconductor substrate for applying voltage to the light-reflecting films and counter electrodes formed on the counter substrate;

a light-blocking layer formed below the light-reflecting films;

a first insulating layer formed between the light-blocking layer and the electric circuit;

a second insulating layer formed between the light-reflecting films and the light-blocking layer;

a stud for electrically connecting the electric circuit and the light-reflecting films, insulated from the light-blocking layer;

light shields provided on the light-blocking layer formed below the light-reflecting films for blocking the incident light from the electric circuit; and a third insulating layer formed between the light shields and the light-reflecting films.

Since the light shields block the light incident from a space between the light-reflecting films and the light-blocking layer further blocks the light, the above-described liquid crystal light valve according to the present invention is capable of blocking the light effectively.

Further, the third insulating layer is capable of ensuring insulation between the light shields and the light-reflecting films and also functioning as a capacitor for storing electric charges. For this reason, the third insulating layers can hold a part or all of the capacitance necessary to drive liquid crystal in each pixel.

In the liquid crystal light valve of the present invention, especially in the reflection-type liquid crystal light valve used in the projection-type liquid crystal display device, the structure of the light shield for shielding the underlying transistor from the incident light from the space between the light-reflecting films is different from that of the conventional art. In the present invention, stud-like light shields are each formed between the light-reflecting layers and the light-blocking films and along the inside peripheral portion of the light-reflecting layers. Since the incident light from the space between the light-reflecting films can be effectively blocked, malfunction of an underlying transistor and pixel failure never occur, but yield and production efficiency can be increased.

Since the insulating layer between the light shield and the light-reflecting film also acts as a capacitor, stable voltage can be applied to the liquid crystal by storing a part of electric charges in this insulating layer.

The present invention also discloses a method for producing the liquid crystal light valve described above In this method for producing the liquid crystal light valve, light shields can be formed in the same step in which the stud is formed, so that remarkable light-blocking effects can be obtained without adding any complicated steps to the conventional steps of producing a liquid crystal display device.

The method for producing the liquid crystal light valve according to the present invention comprises no additional complicated processes, but the liquid crystal light valve of the above configuration can be produced through almost the same steps as the conventional ones.

Alternatively, the capacitor between the light shield and the light-reflecting film can hold all the storage capacitance for a pixel. In this case, there is no need of additional storage capacitor, so that the manufacturing processes can be substantially simplified.

In addition, the present invention also discloses a projection type liquid crystal display device using the above liquid crystal light valve.

The above and other objects, features and advantages of the present invention will be apparent from the following description of preferred embodiments of the invention with reference to the accompanying drawings.

BRIEF DESCRIPTION OF THE DRAWINGS

FIG. 12(a) shows a case where a foreign particle is on an insulating layer, FIG. 12(b) shows a case where a metallic layer is formed on the foreign particle, and FIG. 12(c) shows a case where a liquid crystal light valve shown in FIG. 12(b) is treated by CMP.

DETAILED DESCRIPTION OF PREFERRED EMBODIMENTS OF THE INVENTION

Figure 1:
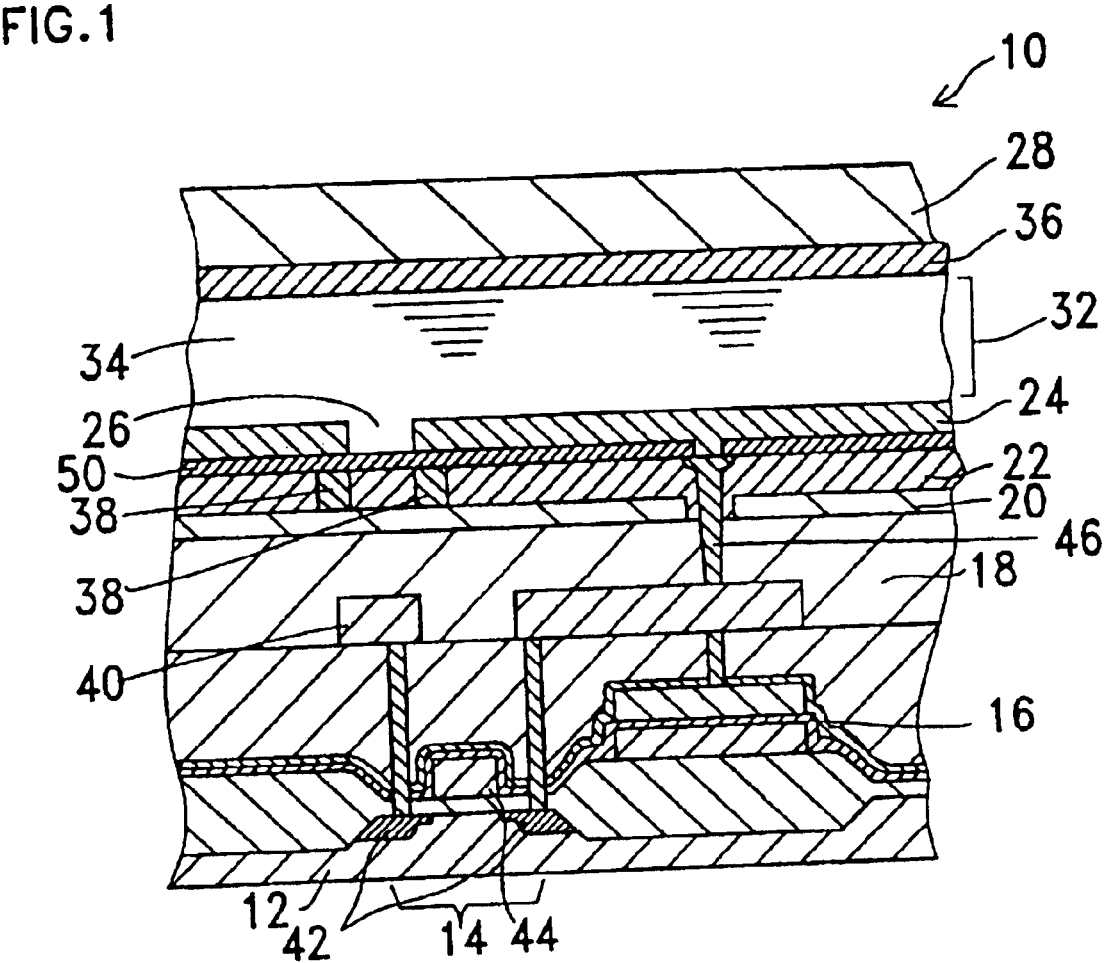
FIG. 1 is a schematic sectional view of an example of a liquid crystal light valve according to the present invention.
Figure 2:
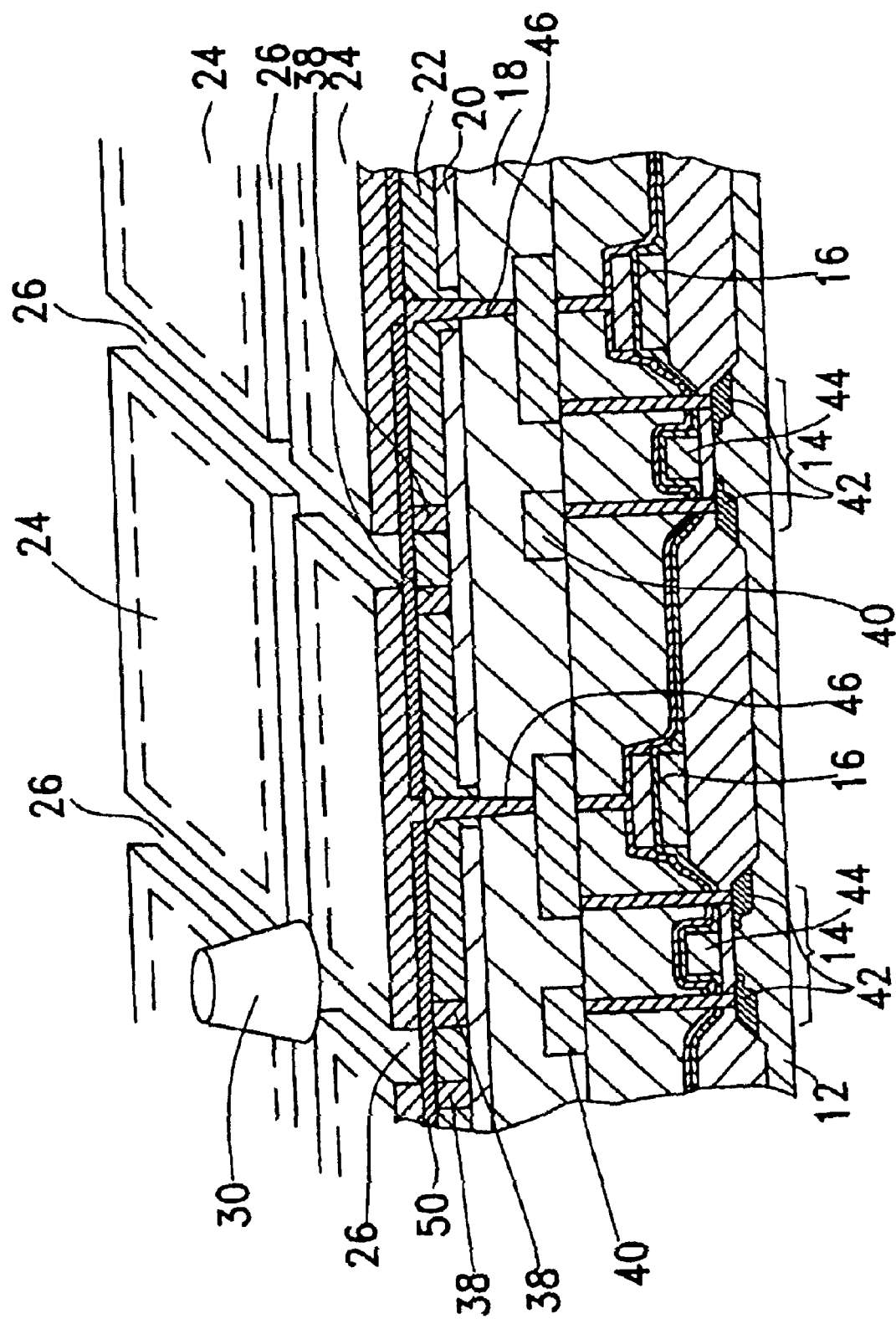
FIG. 2 is a perspective view of a semiconductor substrate of the liquid crystal light valve shown in FIG. 1.

FIG. 1 is a schematic sectional view of an example of a liquid crystal light valve 10 of the present invention, and FIG. 2 is a perspective view of a semiconductor substrate of the liquid crystal light valve shown in FIG. 1. Basically, a liquid crystal light valve comprises a semiconductor substrate, a counter substrate formed on the incident-light side, a plurality of light-reflecting films connected electrically to the semiconductor substrate with space therebetween, and liquid crystal filled in the cell gap between the light-reflecting films and the counter substrate. The construction of the liquid crystal light valve 10 of the present invention will be described in detail below.

An electric circuit is formed on a silicon substrate 12 and comprises a plurality of transistors 14, a storage capacitor 16, and an interconnecting layer having gate lines and data lines connected electrically to the transistors 14. Silicon oxide layers (first insulating layers 18) are formed on the electric circuits, and light-blocking layers 20 are formed on the first insulating layers 18. On the light-blocking layers 20, silicone nitride layers (second insulating layers 22) are formed, and on the second insulating layers 22, a plurality of light-reflecting films 24, each of which are separated by the spaces 26, are provided for each transistor 14. There is a spacer 30 between a glass cover plate 28 and the light-reflecting films 24, and a liquid crystal layer 34 is formed by filling liquid crystal in a cell gap formed by the spacer 30. On the side of the glass cover plate facing the light-reflecting films, a counter substrate having counter electrodes 36 is formed. The spacer 30 is formed on the light-reflecting films, as shown in FIG. 2.

In the liquid crystal light valve 10 of the present invention, light shields 38 are formed below the peripheral portions of the light-reflecting films 24. The alignment of liquid crystal molecules varies in accordance with voltage applied to the counter electrodes 36 and the light-reflecting films 24 (which act as electrodes when the transistors turn on), and transmittance of light is thereby changed. In this way, a screen display is produced by allowing the light incident from the side of glass cover plate to pass through the liquid crystal layer 34 or not.

The transistor 14 is a three-terminal switching FET (field effect transistor) comprising a gate electrode, a source electrode, and a drain electrode which are formed on a thin-film semiconductor. Preferably, a MOS-FET transistor is used, because it has excellent and stable properties, for example, high on-off voltage ratio.

When voltage is applied to the gate electrode 44, a source-drain region connected electrically to the data line 40 applies a driving voltage to the liquid crystal layer 34 and the storage capacitor 16. The gate electrode 44 is turned on and off by a signal from the gate line. When the gate electrode 44 is turned on, a signal voltage applied by a display signal from the data line 40 is applied to the light-reflecting films 24 (display electrodes) through the source-drain region 42. A potential difference between a voltage applied to the display electrodes and a voltage applied to the counter electrodes 36 acts as a driving voltage to drive the liquid crystal. On the other hand, when a voltage is applied to the storage capacitor 16 and the gate electrode 44 is turned off, the voltage applied to the liquid crystal layer 34 and the voltage applied to the storage capacitor 16 are retained. As shown in FIG. 1, the storage capacitor 16 may be of a Cs on-gate structure connected to an adjacent gate line, however, it may be of an independent structure.

The light-reflecting films 24 are separated by the space 26, so that they are electrically insulated from each other. One light-reflecting film 24 constitutes one pixel. Each of the light-reflecting films 24 is electrically connected to each of the transistors 14 by a stud 46 in a groove bored in a first insulating layer 18 (silicon oxide layer) and a second insulating layer 22 (silicon nitride layer). The light-reflecting films 24 reflect light incident from the side of glass cover plate 28 and act as a display electrode when a voltage is applied to the liquid crystal layer 34 by the FET.

The first insulating layer 18 is formed between the transistor 14 and the light-blocking layer 20. The material of the first insulating layer may be $SiO_2$ or a glass consisting mainly of $SiO_2$, $Si_3N_4$, $TaO_x$, $ZrO_x$, diamond carbon, $Al_2O_3$, PSG, or a compound such as polyamide. Silicon oxide film which is to be used as the first insulating layer 18 is, for example, deposited by chemical vapor deposition (CVD) by using tetraethyl ortho silicate (TEOS) as a precursor gas.

The light-blocking layer 20 blocks the light from a light source. The layer 20 prevents a reflection of light transmitted to the light-blocking layer 20 and acts as an etching stopper for a light shield 38 which is to be formed afterward. Therefore, this light blocking layer 20 can prevent light from being transmitted to an FET (field effect transistor) side. As the material of the light blocking layer 20, a material which does not react with an etching agent contained in the insulating layer, and which can prevent electromigration, may preferably be used. For example, the light-blocking layer 20 may be preferably formed by laminating one or more metals selected from a group consisting of Al, Cr—$Cr_xO_y$, Ti, TiN, and $TiN_xC_y$. Specifically, the light-blocking layer 20 may be formed by sputter-depositing 10 nm-thick Ti layer, 100 nm-thick Al(Cu) layer and 500 nm-thick TiN layer and then patterning them by means of reactive ion etching (RIE).

The second insulating layer 22 isolates the light-blocking layer 20 from the light-reflecting film 24 electrically. Furthermore, it also stores electric capacitance in the area between the light-blocking layer 20 and the light-reflecting film 24 and preserves voltage in the light-reflecting film 24. For this reason, the second insulating layer 22 should be thick enough to increase capacitance and to prevent short circuits between the light-blocking layers 20 and the light-reflecting films 24. The material of the second insulating layer 22 may be the same as or different from that of the first insulating layer 18, but it can be selected from $SiO_2$ or a glass consisting mainly of $SiO_2$, $Si_3N_4$, $TaO_x$, $ZrO_x$, diamond carbon, $Al_2O_3$, PSG, or a compound such as polyamide. Since $Si_3N_4$ has a higher dielectric constant, $Si_3N_4$ can store higher electric capacitance than $SiO_2$ of the same thickness. $Si_3N_4$ is more preferably used as the material of the second insulating layer 22 than $SiO_2$. If silicon nitride film is used as the second insulating layer 22 for example, the second insulating layer 22 may be deposited by a chemical vapor deposition (CVD) using $SiH_4$, $NH_3$ gas.

The studs 46 are provided so as to electrically connect the transistors to the light-reflecting films. From a functional standpoint, the studs 46 should have excellent electric conductivity and low reflectance, From a procedural standpoint, the studs 46 should be conformal with a high aspect ratio, be removed by using chemical-mechanical polish (CMP), and be made of such a material that has little effect on semiconductor elements. From the above standpoints, such metal as Ti, W, Mo, Cu, or Al, alloys thereof, or a metal compound thereof with silicon and the like can be used as the material of the stud 46.

As shown in FIG. 2, the light shields 38 are each formed between the light-reflecting films 24 and the light-blocking layers 20 and along the inside peripheral portion of the light-reflecting films 24. The material of the light shields 38 is not particularly limited, as far as it is a light proof material and prevents irregular reflection of a light beam. Therefore, the material of the light shields 38 can be the same as or different from that of the stud 46. However, it is preferable that the material of the light shields 38 are the same as that of the stud 46, because if so, the light shields 38 and the stud 46 can be formed in the same step. Specifically, such metals as Ti, W, Mo, Cu, or Al, alloys thereof, or a compound thereof with silicon and the like can be used as the material of the light shields 38.

The light shields 38 of the liquid crystal light valve shown in FIG. 1 are electrically insulated from the light-reflecting films 24 by the third insulating layer of silicon nitride film. Most of the light incident from the space between light-reflecting films 24 is blocked by the light shields 38 and the light-blocking layers 20. When the light is transmitted into the third insulating layers 50 (silicon nitride films) formed between the light shields 38 and the light-reflecting films 24, the light is reflected by the light-reflecting films 24 and the upper surfaces of the light shields 38. Then it travels to the second insulating layer 22 (silicon nitride layer) and is blocked by the light-blocking layer 20. In this way, since almost all the incident light is blocked and does not reach to the transistor, occurrence of pixel failure can be prevented.

The reflection of light between the light-blocking layers 20 and the light-reflecting films 24 varies depending on reflectances of the light-blocking layers 20 and the light-reflecting films 24 and the luminous intensity of the incident light. Therefore, the distance between the end of a light-reflecting film 24 and the light shield 38 can be determined in consideration of the reflectances and the luminous intensity. In terms of allowable amount of leakage of light to a lower layer and alignment accuracy in a photolithographic step, light shields 38 are preferably formed below the inside peripheral portions of the light-reflecting films 24 at a distance of 0.2 $\mu$m from the ends of the films. For example, if the third insulating layer has a thickness of 400 Å, the light-blocking layer 20 and the light-reflecting film 24 each have a reflectance of 60%, and an incident angle is 80 degrees, light shields 38 are preferably formed below the inside peripheral portions of light-reflecting films 24, at a distance of about 0.4 $\mu$m from the ends of the films, the leakage of light to a lower layer will be limited to an allowable amount.

The third insulating layers 50 are thin layers to cover the light shields 38 and the second insulating layers 22. Being brought into intimate contact with the second insulating layers 22, the third insulating layers 50 cover up pinholes and the like on the surfaces of the second insulating layers 22. The third insulating layers 50 can be thin and flat, so that the light-reflecting films 24 on the layers 50 can be formed flat. Even if the light shields 38 are conductive, the third insulating layers 50 electrically isolate light-reflecting films 24 from light-blocking layers 20 and may hold a constant electric capacitance. The material of the third insulating layers 50 may be the same as those of the first insulating layers and the second insulating layers.

Although the above-described liquid crystal light valve according to the present invention has a storage capacitor 16, the second insulating layer 22 also acts as a capacitor because the light-blocking layers 20 and the light-reflecting films 24 act as electrodes. Furthermore, the third insulating layers 50, which exist between the light shields 38 and the light-reflecting films 24, also function as capacitors. Since electrodes are formed by the light shields 38 and the light-reflecting films 24 and electric charges are stored in the third insulating layers 50, a part of storage capacitance necessary to drive each liquid crystal pixel can be provided by the third insulating layers 50. These additional capacitors also hold the voltage for driving liquid crystal when the gate electrode 44 is off. Therefore, the material of the third insulating layers 50 may be the same as those of the first insulating layers and the second insulating layers. Preferably, $Si_3N_4$, $TaO_x$, or $ZrO_x$ may be used as the material of the third insulating layers 50 due to their large dielectric constant.

The thickness of the third insulating layer 50 can vary depending on the magnitude of a signal voltage and the material of the layers 50. Since capacitance is increased as the spacing between the electrodes is decreased, the thickness of the third insulating layer 50 may be 1000 Å or less, preferably 500 Å or less , and more preferably 400 Å or less. If the third insulating layers function as capacitors, the thickness is preferably 50 Å or more in terms of intrinsic breakdown voltage and insulation. For example, if the maximum signal voltage is 5V, the third insulating layers 50 are 400 Å-thick silicon nitride films, and the light shields 38 are placed underneath and 1 $\mu$m from the ends of the peripheral portions of the light-reflecting films 24, the third insulating layers 50 may hold capacitance necessary to drive liquid crystal in normal-size pixels.

In FIG. 2, the spacer 30 is represented as a spacer post. However, the shape, the material, and the position of the spacer, and the method of forming the spacer are not particularly limited in the present invention, but the spacer can be formed by ordinary techniques of those skilled in the art. The material of the transparent cover plate 28 is not limited to glass, but it may be a material having heat resistance, chemical resistance, and mass production efficiency.

Figure 3A:
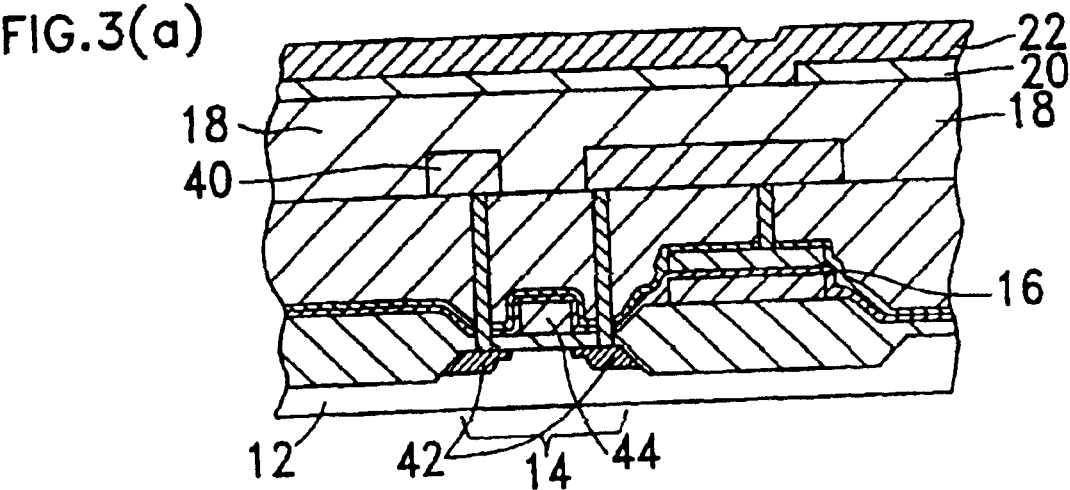
FIGS. 3(a) to (c) each show a part of a process of producing the liquid crystal light valve shown in FIG. 1.
Figure 3B:
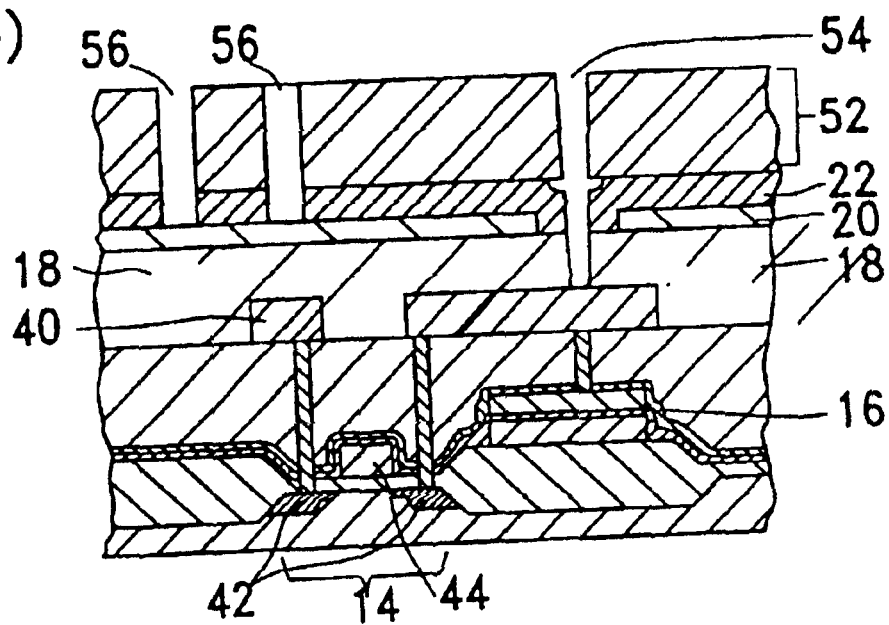

An example of the method for producing a liquid crystal light valve of the present invention will be described below with reference to FIGS. 3(a) to (c) and FIGS. 4(d) to (f) An electric circuit comprising a transistor 14 and interconnecting layers is formed on the silicon substrate 12, and then the first insulating layers 18 are formed on the electric circuit. After the surface of the first insulating layers 18 are planarized by chemical-mechanical polishing (CMP), the light-blocking layers 20 are formed thereon. A through-hole is bored in a certain area of the light-blocking layers 20 to insulate this area from the area where the stud 46 is formed, and then the second insulating layers 22 are formed on the light-blocking layers 20 as shown in FIG. 3(a). Positive photo resist is then applied entirely to the upper surfaces of the second insulating layers 22 to form resist layers 52. These resist layers 52 are exposed to light from the top and then they are developed to form a mask within the area of the second insulating layers 22 except for the area where the light shields 38 and the studs 46 are to be formed later. Then the second insulating layers 22 and the first insulating layers 18 are etched to form grooves 54 and 56 in the areas where the light shields 38 and the studs 46 are to be formed later, as shown in FIG. 3(b). In this etching step, etching for the formation of grooves 56 is stopped when it reaches the light-blocking layers 20, while etching for the formation of grooves 54 continues until it reaches the lower wiring. In this way, grooves 54 for the studs 46 and the grooves 56 for the light shields 38 can be formed in the same step. An etching step can be preferably performed by anisotropic etching such as reactive ion etching.

Figure 3C:
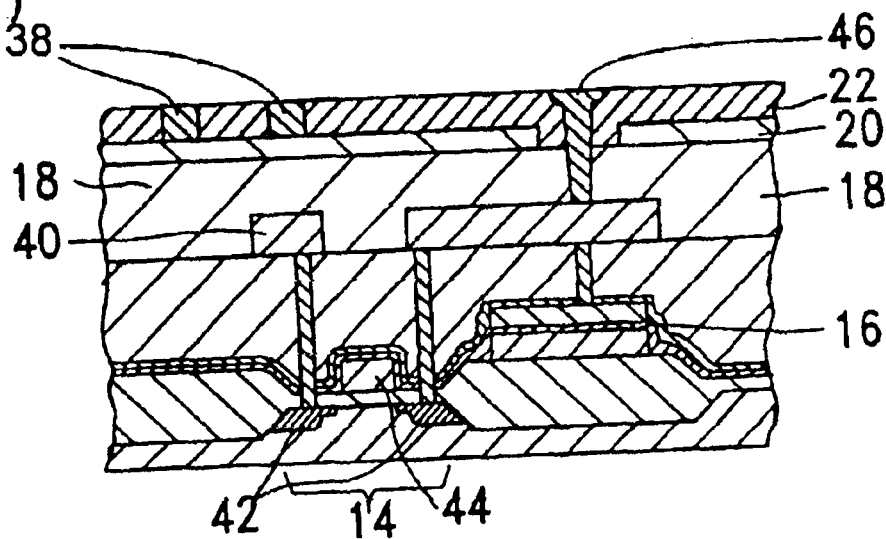

In the grooves 54 and 56, the light shields 38 and the studs 46 are formed from tungsten by chemical vapor deposition (CVD). The light shields 38 and the studs 46 can be formed in the same step. The surfaces of the light shields 38 and the studs 46 are then planarized by chemical-mechanical polishing (CMP) as shown in FIG. 3(c). The light shields 38 are formed on the light-blocking layers 20 and are bored through the second insulating layers 22 to block light incident from the light-reflecting films 24. The studs 46 are bored through the first insulating layers 18 and the second insulating layers 22 to be electrically connected with the light-reflecting films 24 which are to be formed afterward.

Figure 4D:
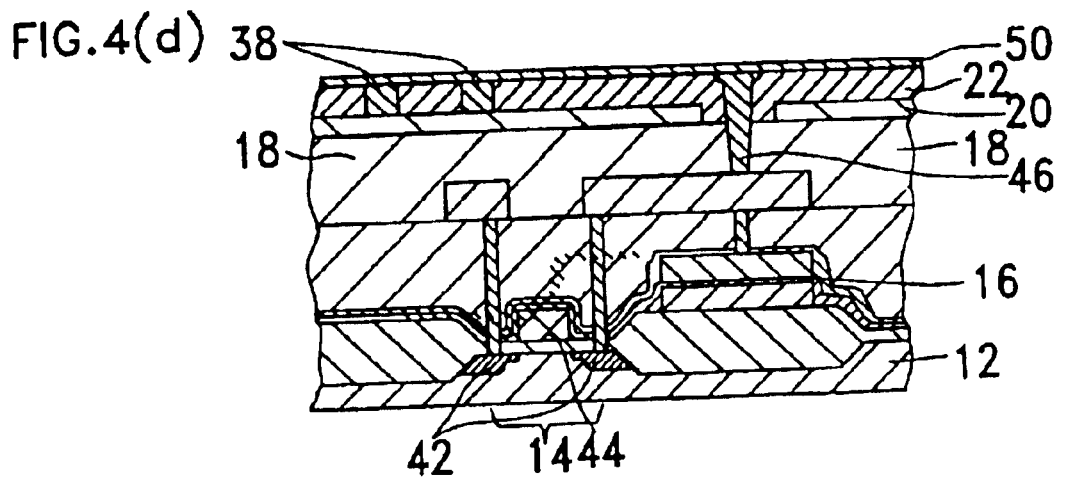
FIGS. 4(d) to (f) each show a part of a process of producing the liquid crystal light valve shown in FIG. 1.

Next, the third insulating layers 50 are formed as shown in FIG. 4(d). Silicon nitride film to be used as the third insulating layers 50 can be deposited by chemical vapor deposition (CVD). To remove the third insulating layers 50 on the studs 46, resists layers 52 are formed by applying positive photo resist to the upper surfaces of the third insulating layers 50 and then they are exposed to light from the top and developed. Thus, mask is formed within the area of the third insulating layers 50 except for the upper portion of the studs 46.

Figure 4E:
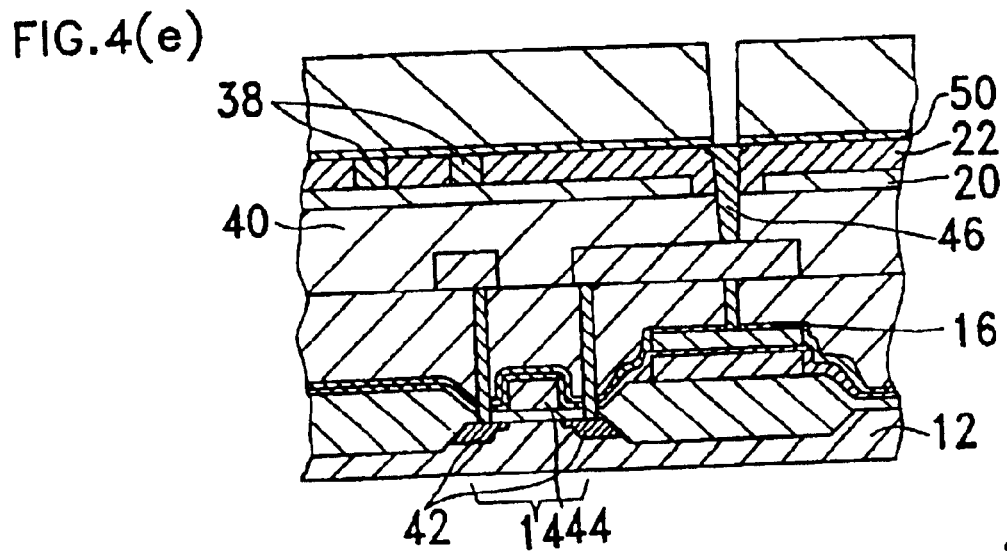

By using this mask, the insulating layers formed on the studs 46 are removed by etching, as shown in FIG. 4(e).

Figure 4F:
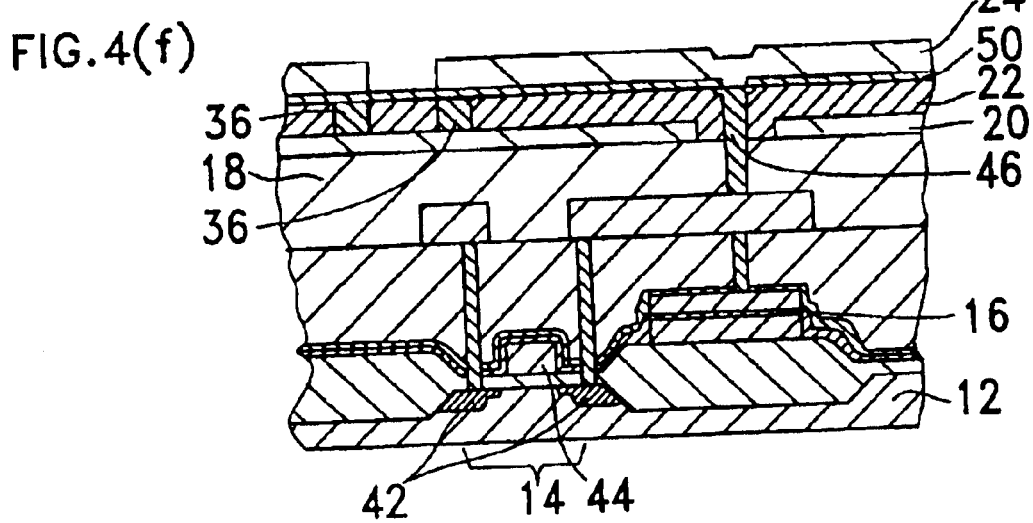

Next, a plurality of light-reflecting films 24 are formed on the third insulation layers 50 and the studs 46, as shown in FIG. 4(f). One light-reflecting film is formed for every one electric circuit. The light-reflecting films 24 may be formed from aluminum only or formed by evaporating or sputtering a 10-nm thick Ti layer, a 100-nm thick Al layer, Al(Cu), or an alloy of Al and other metals. In order to maximize the luminous intensity of reflected light, the space between the reflecting films should be as small as possible. Therefore, the light-reflecting films are preferably patterned by the RIE method. The spaces 26 between the light-reflecting films 24 are formed by etching.

Thus, a semiconductor substrate of a liquid crystal light valve according to the present invention is produced.

On the light-reflecting films 24 of the above-mentioned semiconductor substrate, a spacer 30 is formed, and the semiconductor substrate and the counter substrate having the counter electrode 36 formed on the glass cover plate 28 are aligned. Then, liquid crystal is filled in the cell gap 32 which is formed between the semiconductor substrate and the counter substrate by the spacer 30.

In each step of forming each layer, the surface of each layer can be planarized by CMP (chemical mechanical polish), if necessary. Since a fine structure and high density is required of the liquid crystal light valve, planarization of the surface is important for easy wiring, sufficient insulation, and uniform formation of thin film. Thus, one example of the liquid crystal light valve according to the present invention can be obtained, but the embodiments of the present invention including a method for forming a thin film and the like are not limited to the above.

Figure 5:
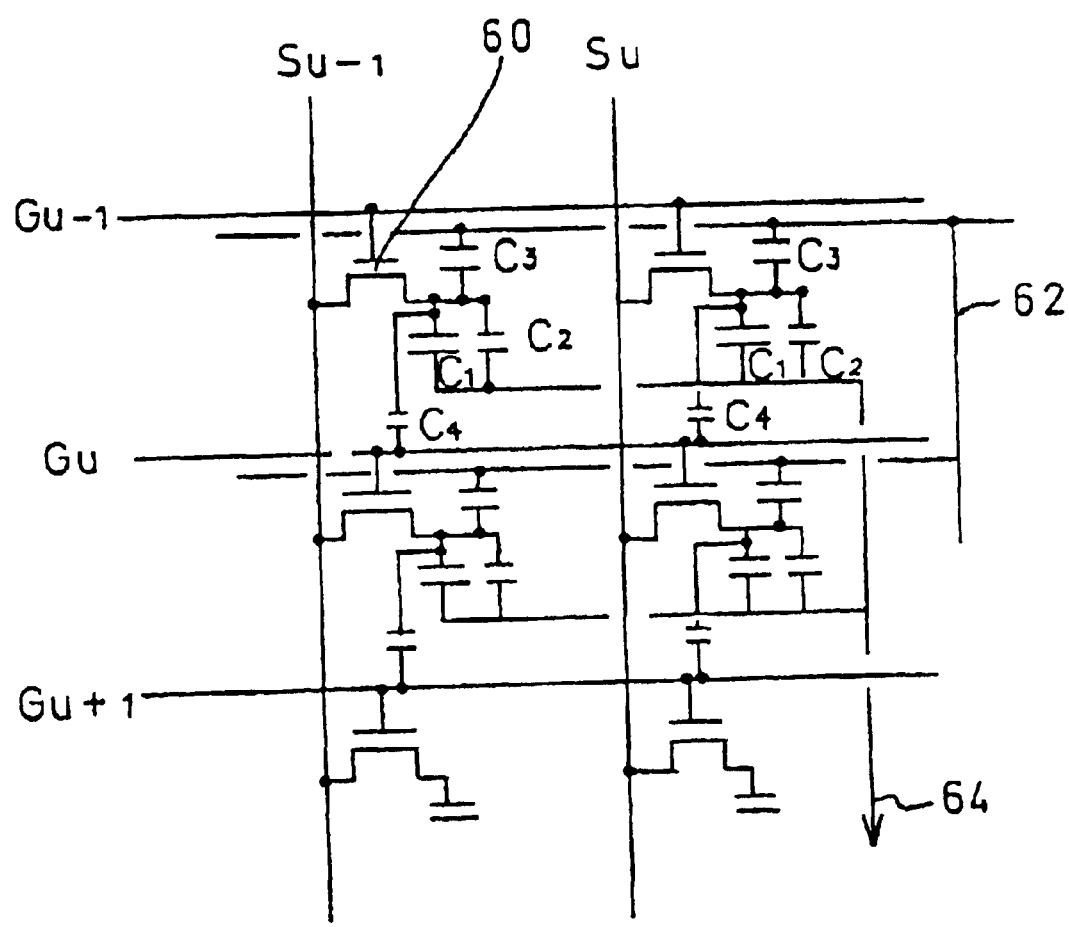
FIG. 5 is an equivalent circuit diagram showing a mutual relationship between capacitors of the liquid crystal light valve according to the present invention.

FIG. 5 is an equivalent circuit diagram showing a mutual relationship between capacitors of the above-obtained liquid crystal light valve. In FIG. 5, S indicates a data line, G indicates a gate line, a numeral 60 indicates an FET, a numeral 62 indicates a counter electrode 36 and a numeral 64 indicates an electrode of a light-blocking layer 20. C1, C2, C3, and C4 each indicate a capacitor: C1 indicates a capacitor between the light shield 38 and the light-reflecting film 24; C2 indicates a capacitor between the light-blocking layer 20 and the light-reflecting film 24; C3 indicates a capacitor between the light-reflecting film 24 and the counter electrode 36; and C4 indicates the storage capacitor 16. Thus, a storage capacitance can be held by a plurality of electrodes in each pixel, a large amount of charge is not accumulated only by the storage capacitor, and a parasitic capacitance can be decreased.

Figure 6:
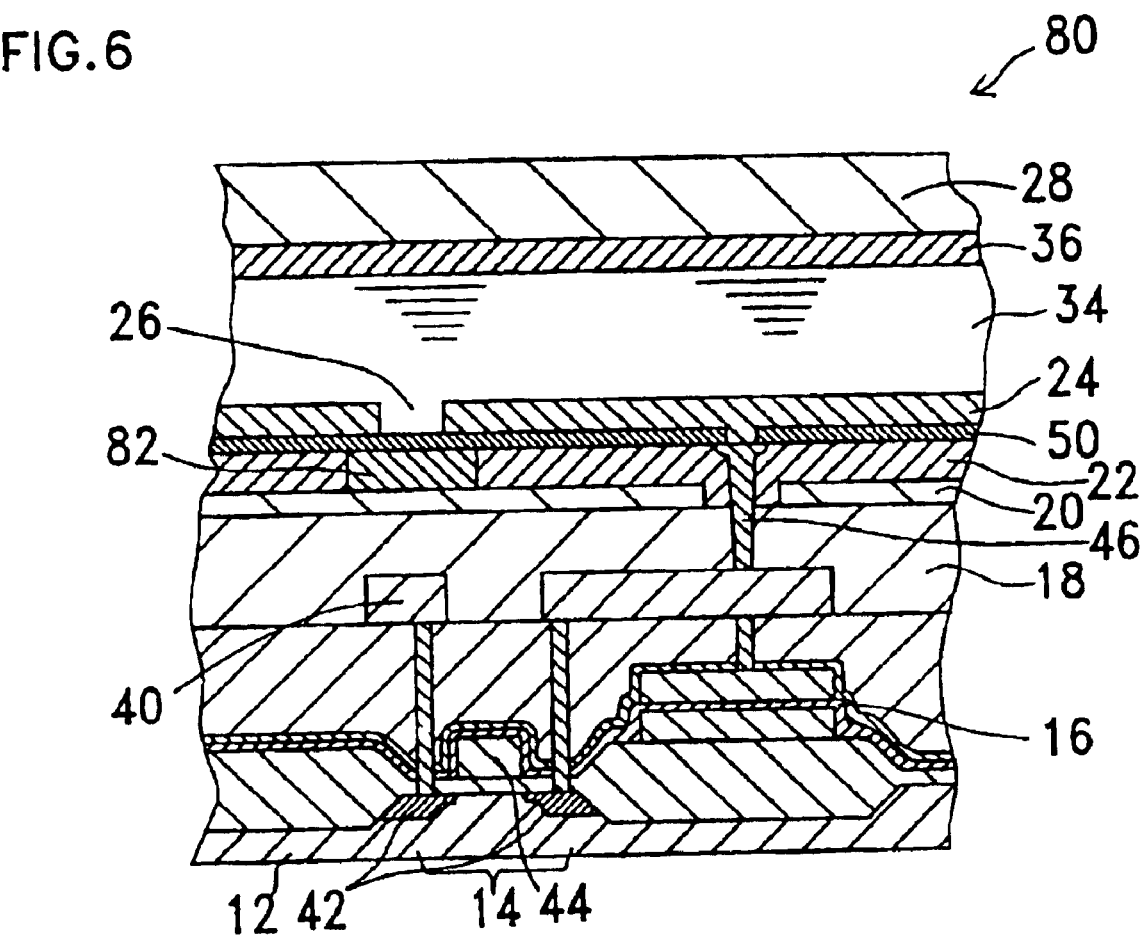
FIG. 6 is a schematic sectional view of another example of a liquid crystal light valve according to the present invention.

Next, a liquid crystal light valve 80 according to another embodiment of the present invention is described with reference to FIG. 6. The liquid crystal light valve 80 is substantially the same as the one shown in FIG. 1 except that a light shield is formed in a different position. In this embodiment, the light shield 82 is formed below the area including the edge portions of the light-reflecting film 24 and the space 26 between the light-reflecting films 24 (each light shield has a constant width from the edge portions). In the liquid crystal light valve of this configuration, an incident light from a light source is reflected by the light shield 82, and only a part of the reflected light is transmitted into the thin third insulating layer 50 between the stud 82 and the light-reflecting film 24.

Furthermore, according to the liquid crystal light valve of this construction, even if the misalignment of the space 26 occurs on the upper part of a light shield 82 in a step of forming the light-reflecting films 24, the light passing through the space 26 between the light-reflecting films 24 can be blocked completely by the light shield 82. In addition, the area of the light shield 82 can be adjusted according to the width of the light shield formed below the light-reflecting film 24. It is preferable that the storage capacitance can store a uniform amount of electric charge between the light-shield 82 and the light-reflecting film 24 for each pixel in a self-aligned manner.

Figure 7:
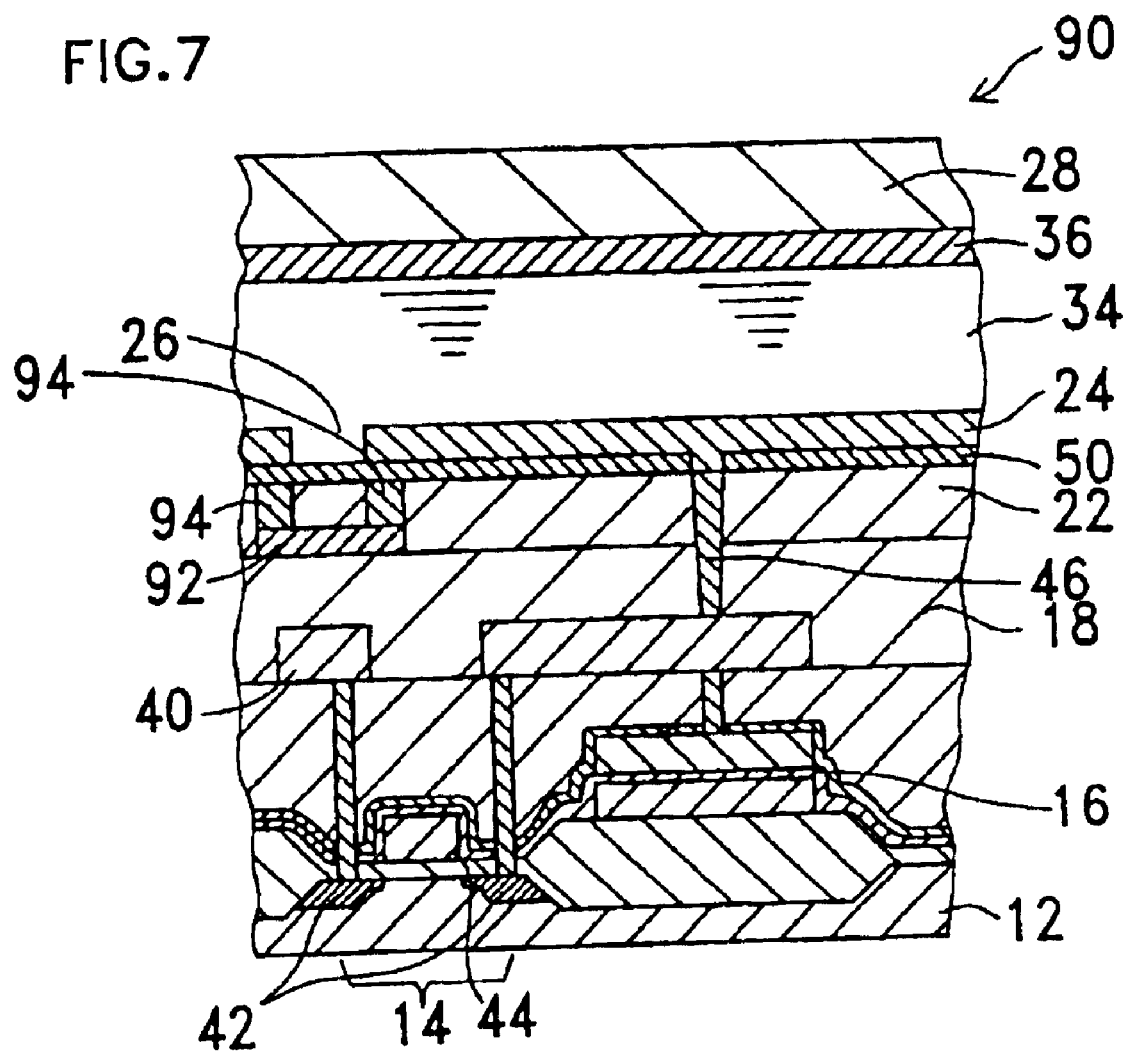
FIG. 7 is a schematic sectional view of still another example of a liquid crystal light valve according to the present invention.

Next, another embodiment of the present invention will be described below with reference to FIG. 7. A liquid crystal light valve 90 is the same as the one described in the above embodiments except that a light-blocking layer 92 is formed just under light shields 94. The light shield 94 may be formed just below the inside peripheral portion of the light-reflecting films as shown in FIG. 1, or it may be formed below the area including the inside peripheral portion of the light-reflecting films and the space between the light-reflecting films, as shown in FIG. 6. Almost all the light passing through the space between the light-reflecting films can be blocked by the light shields 94. Since the transistor is protected despite the absence of light blocking layer (except the section 92), this configuration can be used for the liquid crystal light valve, unless the loss of electric capacitance between the light blocking layer and the light-reflecting film is a problem.

Figure 8:
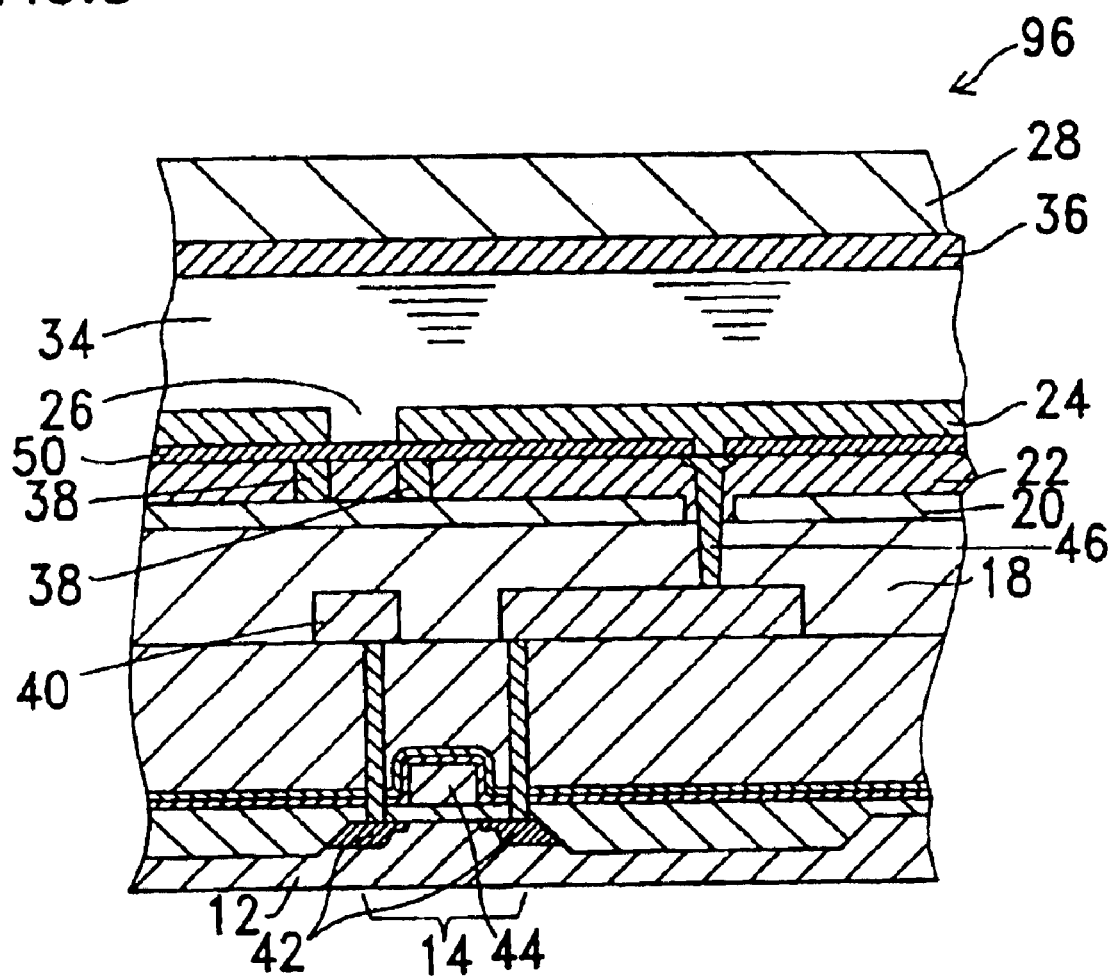
FIG. 8 is a schematic sectional view of a further example of a liquid crystal light valve according to the present invention.
Figure 9:
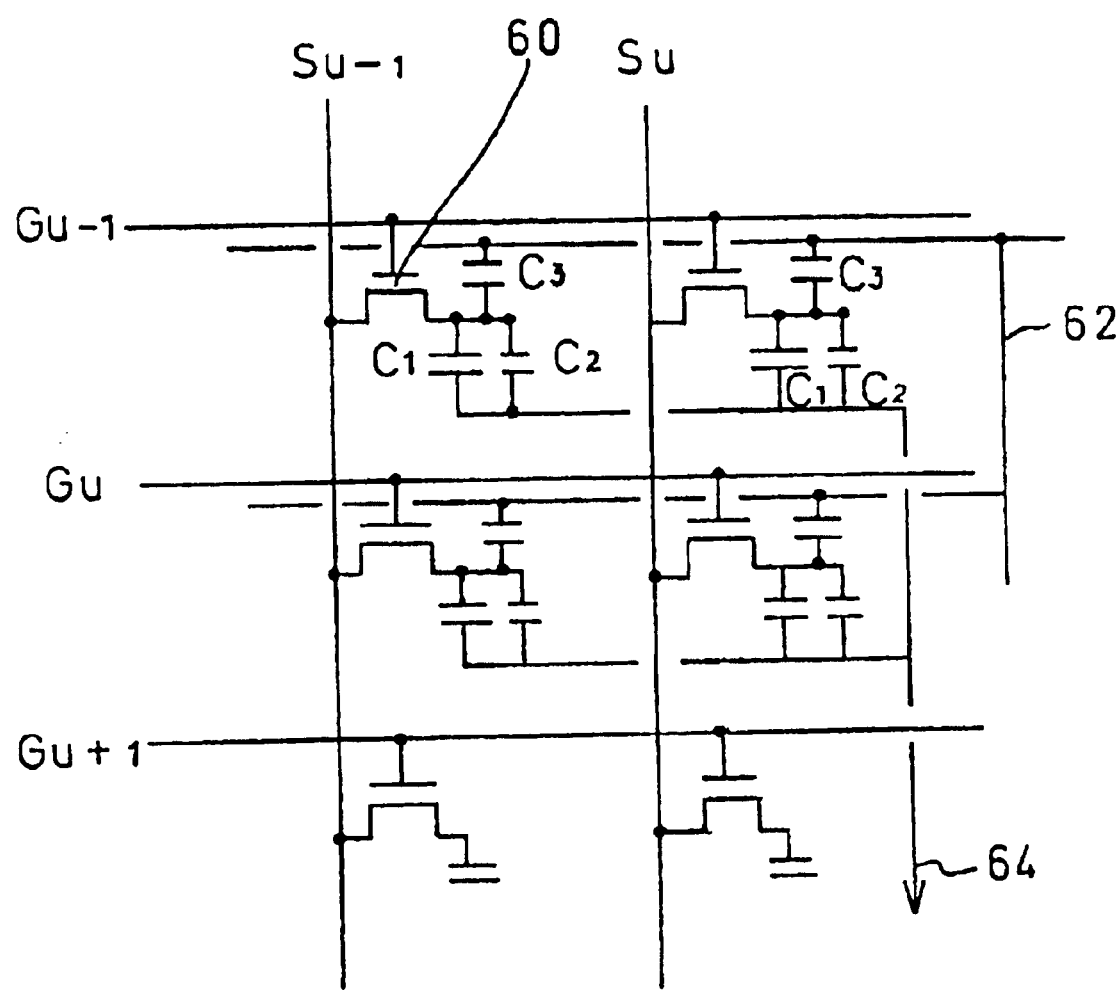
FIG. 9 is an equivalent circuit diagram showing a mutual relationship between capacitors of the liquid crystal light valve shown in FIG. 8.

Furthermore, a liquid crystal light valve according to the present invention can also be so designed that a capacitor C1 between the light shield and the light-reflecting film can hold all the storage capacitance required by a pixel. In this case, a capacitor C4 becomes unnecessary. Therefore, as shown in FIG. 8, it is also possible to provide such a liquid crystal light valve 96 which does not comprise the storage capacitor 16. An equivalent circuit diagram of the liquid crystal light valve 96 is shown in FIG. 9. The light shield may be formed just below the inside peripheral portion of the light-reflecting film as shown in FIG. 1 or it may be formed below the area including the inside peripheral portion of the light-reflecting films and the space between the light-reflecting films, as shown in FIG. 6. Furthermore, the light-blocking layer may be formed substantially all over the first insulating layer as shown in FIG. 1 or it may be formed just below the light shield as shown in FIG. 7. The liquid crystal light valve of the configuration described in this embodiment may realize the simplification of the processes for producing semiconductor substrates, the reduction of the storage capacitance of the gate line, and fast response and low power consumption of LCDs.

Figure 10:
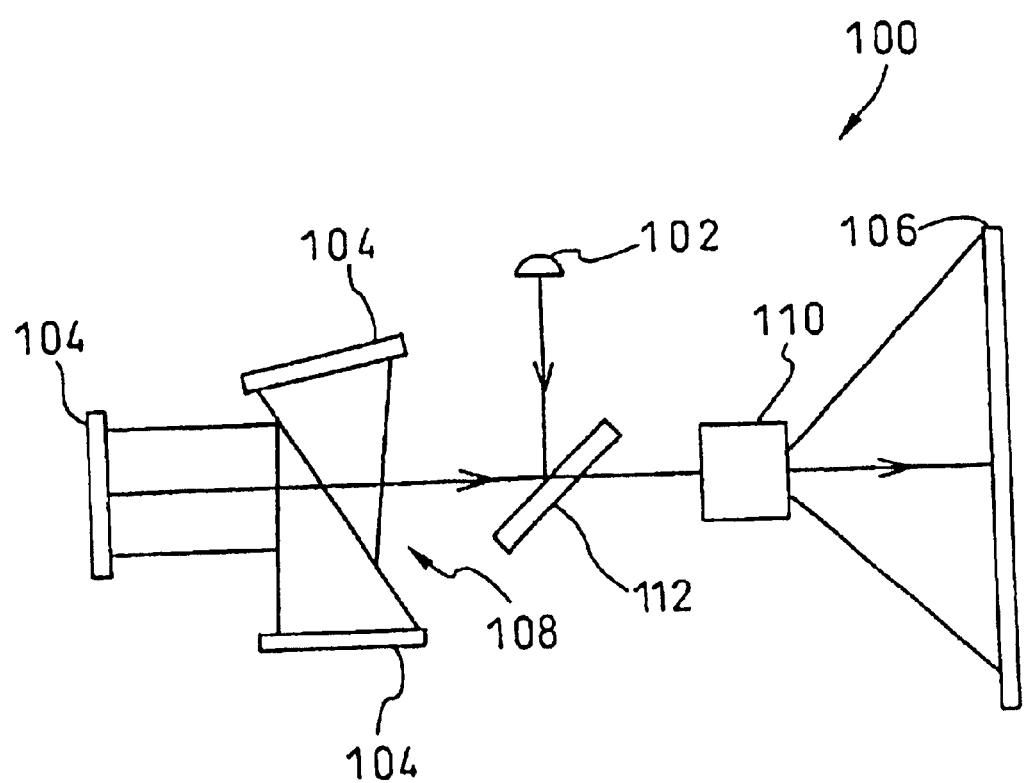
FIG. 10 is a schematic sectional view of an example of a projection type liquid crystal display device according to the present invention.
Figure 11:
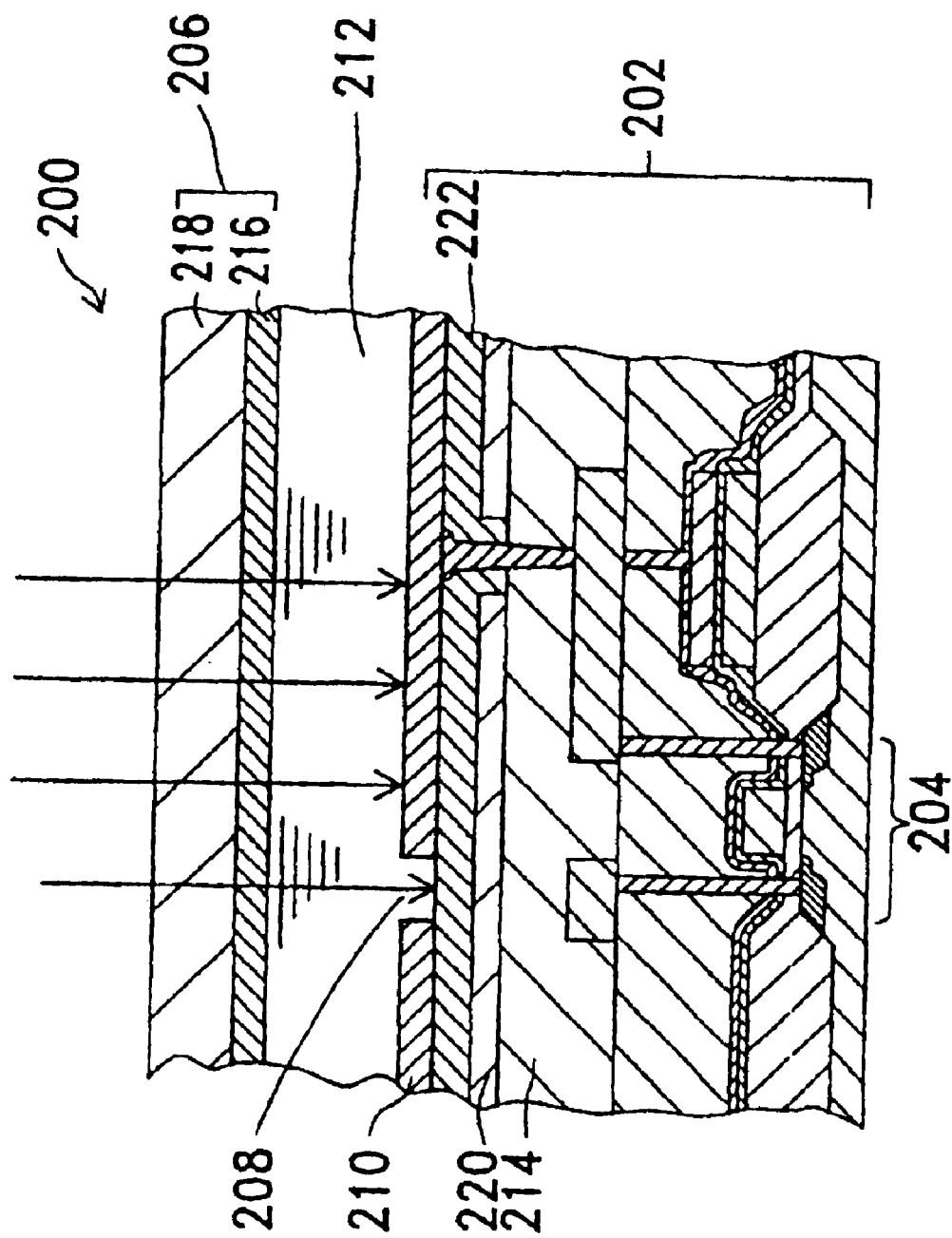
FIG. 11 is a schematic sectional view of one example of a conventional liquid crystal light valve.
Figure 12A:
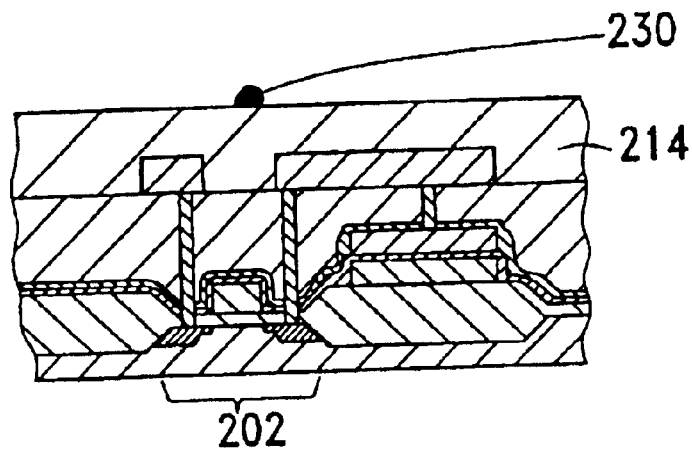
FIGS. 12(a) to (c) each are schematic sectional views of a liquid crystal light valve with a foreign particle on it.
Figure 12B:
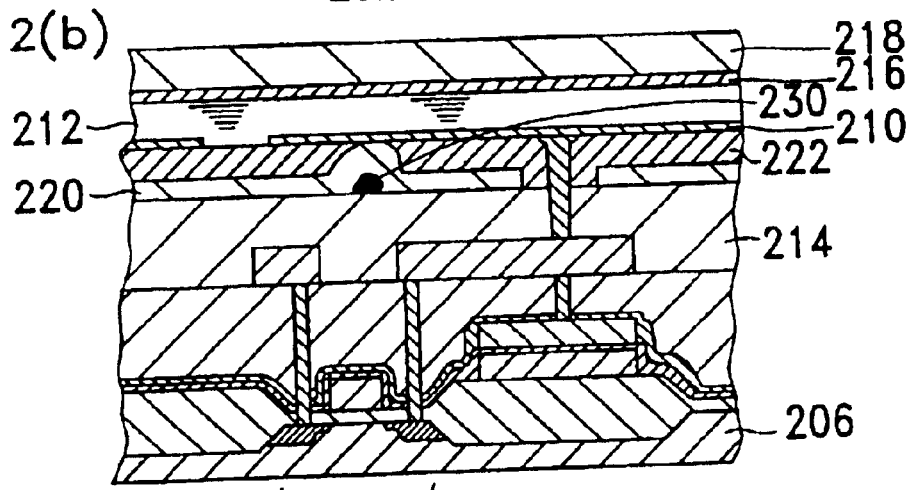
Figure 12C:
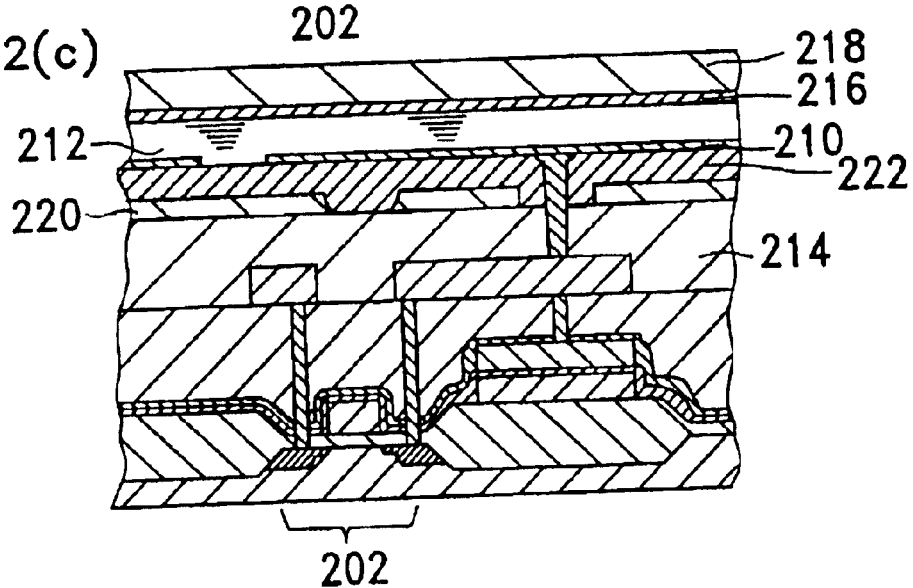
Figure 13:
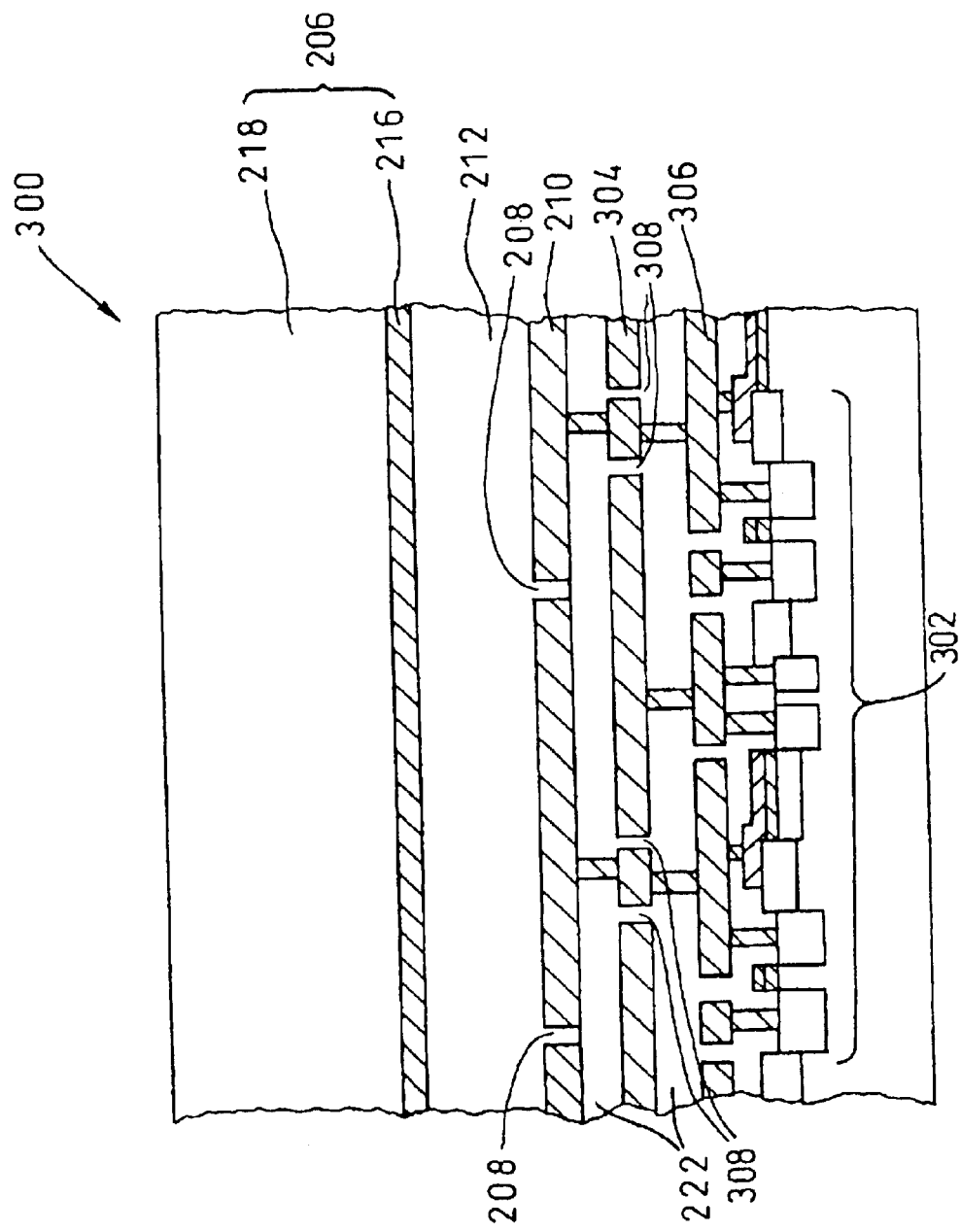
FIG. 13 is a schematic sectional view of another example of a conventional liquid crystal light valve.
Figure 14:
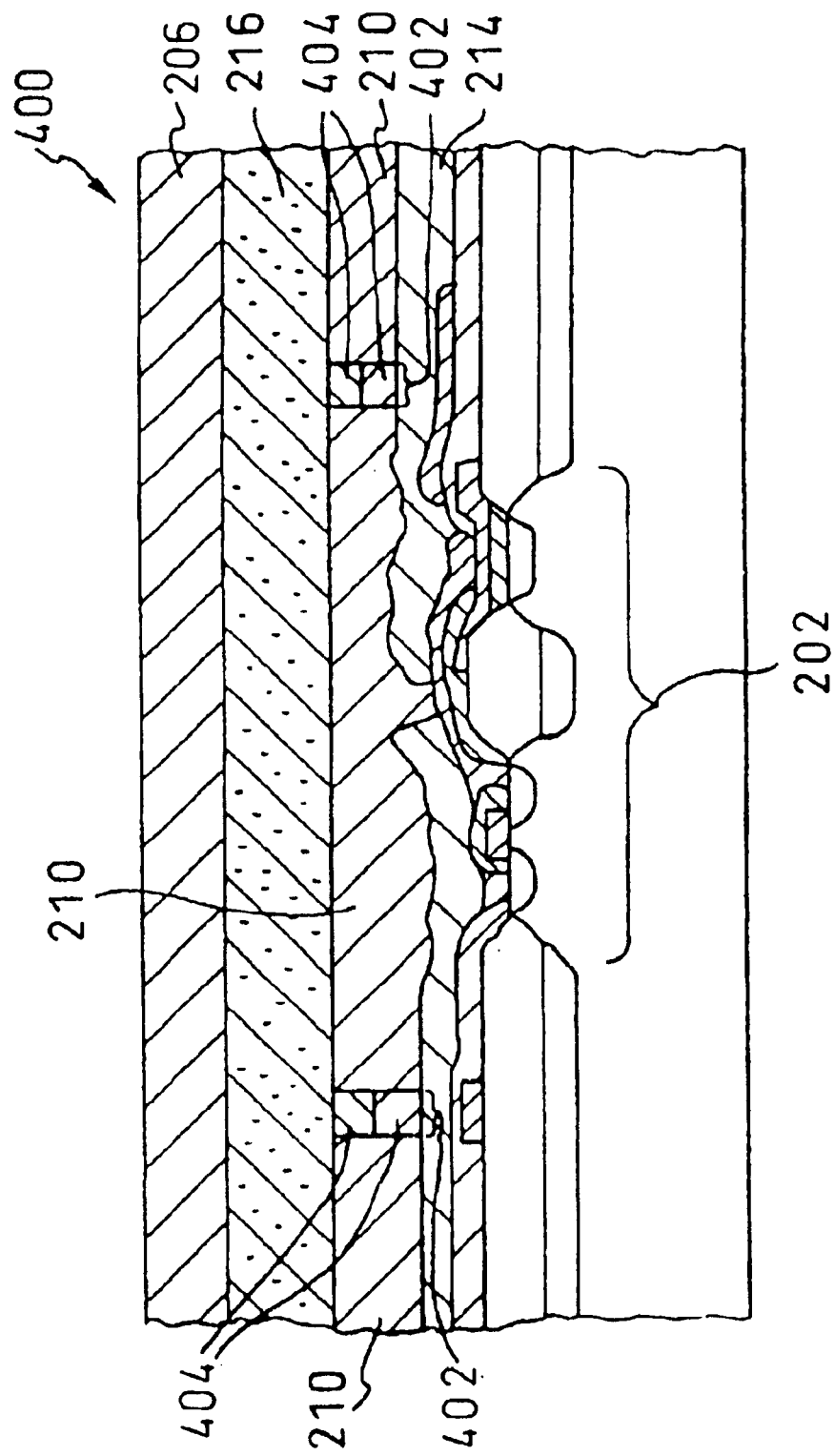
FIG. 14 is a schematic sectional view of still another example of a conventional liquid crystal light valve.

A projection-type liquid crystal display device according to the present invention comprises the liquid crystal light valve described above. More specifically, as shown in FIG. 10, the projection-type liquid crystal display device 100 according to the present invention comprises: a light source 102; light valves 104; a screen 106; an optical filter 108; and a projection lens 110. A light from the light source 102 is reflected by a polarizing beam splitter 112 and is transmitted to an optical filter (color-separation prism) 108. Then the light is divided into three primary colors of red, blue, and green, and the divided lights are transmitted to reflection-type liquid crystal light valves 104 for red, blue, and green, respectively. After the brightness for each pixel is modulated in each reflection-type liquid crystal light valve, the light is transmitted again to the optical filter (color-separation prism) 108 and its linear polarization is rotated at 90 degrees. After that, the light is transmitted to the projection lens 110 through a polarizing beam splitter 112, and is enlarged on the screen 106 as an image. In FIG. 10, an arrow indicates an optical path.

While the invention has been shown and described with respect to preferred embodiments thereof and with reference to the drawings, it will be understood by those skilled in the art that changes and modifications may be made without departing from the spirit and scope of the invention, which should be limited only by the scope of the appended claims.

What is claimed is:

1. A liquid crystal light valve comprising:
   a plurality of light-reflecting films with one or more spaces therebetween;
   a semiconductor substrate connected electrically to the light-reflecting films;
   a counter substrate provided on an incident-light side thereof;
   liquid crystal disposed in a cell gap formed between the light-reflecting films and the counter substrate;
   counter electrodes provided on the counter-substrate;
   an electric circuit formed in the semiconductor substrate, which is configured to apply voltage to the light-reflecting films and the counter electrodes formed on the counter substrate;
   a light-blocking layer formed below the light-reflecting films;
   a first insulating layer formed between the light-blocking layer and the electric circuit;
   a second insulating layer formed between the light-reflecting films and the light-blocking layer;
   a stud which is configured to electrically connect the electric circuit and the light-reflecting films;
   light shields provided on the light-blocking layer formed below the light-reflecting films; and
   a third insulating layer formed between the light shields and the light-reflecting films;
   wherein at least one of said light shields and said light-blocking layer is configured to block the incident light from the electric circuit.

2. The liquid crystal light valve according to claim 1, wherein the light-blocking layer is formed just below the light shields.

3. The liquid crystal light valve according to claim 1, wherein the electric circuit in the semiconductor substrate has a storage capacitance.

4. The liquid crystal light valve according to claim 1, wherein the electric circuit in the semiconductor substrate does not have a storage capacitance.

5. The liquid crystal light valve according to claim 1, wherein the stud and the light shields are formed from one substance selected from the group consisting of Ti, W, Mo, Cu, Al, alloys thereof, and compounds thereof with silicon.

6. The liquid crystal light valve according to claim 1, wherein the light-blocking layers are formed by laminating at least one metal selected from a group consisting of Al, Cr—$Cr_xO_y$, Ti, TiN, and $TiN_xC_y$.

7. The liquid crystal light valve according to claim 1, wherein the third insulating layer has a thickness of 50 Å to 1000 Å.

8. The liquid crystal light valve according to claim 1, wherein the light-reflecting films have ends, and wherein the light shields are formed below the inside peripheral portions of the light-reflecting films at least 0.2 $\mu$m from the ends thereof.

9. The liquid crystal light valve according to claim 1, wherein the first, the second, and the third insulating layers contain at least one substance selected from the group consisting of $SiO_2$, $Si_3N_4$, $TaO_x$, $ZrO_x$, diamond carbon, and polyamide.

10. The liquid crystal light valve according to claim 9, wherein the first and the second insulating layers are formed from one substance selected from the group consisting of $SiO_2$, $Si_3N_4$, $TaO_x$, and $ZrO_x$.

11. The liquid crystal light valve according to claim 9, wherein the third insulating layer is formed from one substance selected from the group consisting of $Si_3N_4$, $TaO_x$, and $ZrO_x$.

12. A liquid crystal light valve comprising:
    a plurality of light-reflecting films with one or more spaces therebetween, wherein said light-reflecting films have inside peripheral portions;
    a semiconductor substrate connected electrically to the light-reflecting films;
    a counter substrate provided on an incident-light side thereof;
    liquid crystal disposed in a cell gap formed between the light-reflecting films and the counter substrate;
    counter electrodes provided on the counter substrate;
    an electric circuit formed in the semiconductor substrate, which is configured to apply voltage to the light-reflecting films and the counter electrodes formed on the counter substrate;
    a light-blocking layer formed below the light-reflecting films;
    a first insulating layer formed between the light-blocking layer and the electric circuit;
    a second insulating layer formed between the light-reflecting films and the light-blocking layer;
    a stud which is configured to electrically connect the electric circuit and the light-reflecting films;
    light shields provided on the light-blocking layer formed below the inside peripheral portions of the light-reflecting films; and
    a third insulating layer formed between the light shields and the light-reflecting films;
    wherein at least one of said light shields and said light-blocking layer are configured to block the incident light from the electric circuit.

13. The liquid crystal light valve according to claim 12, wherein the light-blocking layer is formed just below the light shields.

14. The liquid crystal light valve according to claim 12, wherein the electric circuit in the semiconductor substrate has a storage capacitance.

15. The liquid crystal light valve according to claim 12, wherein the electric circuit in the semiconductor substrate does not have a storage capacitance.

16. The liquid crystal light valve according to claim 12, wherein the stud and the light shields are formed from one substance selected from the group consisting of Ti, W, Mo, Cu, Al, alloys thereof, and compounds thereof with silicon.

17. The liquid crystal light valve according to claim 12, wherein the light-blocking layers are formed by laminating at least one metal selected from a group consisting of Al, Cr—$Cr_xO_y$, Ti, TiN, and $TiN_xC_y$.

18. The liquid crystal light valve according to claim 12, wherein the third insulating layer has a thickness of 50 Å to 1000 Å.

19. The liquid crystal light valve according to claim 12, wherein the light-reflecting films have ends, and wherein the light shields are formed below the inside peripheral portions of the light-reflecting films at least 0.2 μm from the ends thereof.

20. The liquid crystal light valve according to claim 12, wherein the first, the second, and the third insulating layers contain at least one substance selected from the group consisting of $SiO_2$, $Si_3N_4$, $TaO_x$, $ZrO_x$, diamond carbon, and polyamide.

21. The liquid crystal light valve according to claim 20, wherein the first and the second insulating layers are formed from one substance selected from the group consisting of $SiO_2$, $Si_3N_4$, $TaO_x$, and $ZrO_x$.

22. The liquid crystal light valve according to claim 20, wherein the third insulating layer is formed from one substance selected from the group consisting of $Si_3N_4$, $TaO_x$, and $ZrO_x$.

23. A liquid crystal light valve comprising:
 a plurality of light-reflecting films with one or more spaces therebetween, wherein said light-reflecting films have inside peripheral portions;
 a semiconductor substrate connected electrically to the light-reflecting films;
 a counter substrate provided on an incident-light side thereof;
 liquid crystal disposed in a cell gap between the light-reflecting films and the counter substrate;
 an electric circuit formed in the semiconductor substrate, which is configured to apply voltage to the light-reflecting films and the counter electrodes formed on the counter substrate;
 a light-blocking layer formed below the light-reflecting films;
 a first insulating layer formed between the light-blocking layer and the electric circuit;
 a second insulating layer formed between the light-reflecting films and the light-blocking layer;
 a stud which is configured to electrically connect the electric circuit and the light-reflecting films;
 light shields formed below the area including the inside peripheral portions of the light-reflecting films and the space between the light-reflecting films; and
 a third insulating layer formed between the light shields and the light-reflecting films;
 wherein at least one of said light shields and said light-blocking layer is configured to block the incident light from the electric circuit.

24. The liquid crystal light valve according to claim 23, wherein the light-blocking layer is formed just below the light shields.

25. The liquid crystal light valve according to claim 23, wherein the electric circuit in the semiconductor substrate has a storage capacitance.

26. The liquid crystal light valve according to claim 23, wherein the electric circuit in the semiconductor substrate does not have a storage capacitance.

27. The liquid crystal light valve according to claim 23, wherein the stud and the light shields are formed from one substance selected from the group consisting of Ti, W, Mo, Cu, Al, alloys thereof, and compounds thereof with silicon.

28. The liquid crystal light valve according to claim 23, wherein the light-blocking layers are formed by laminating at least one metal selected from a group consisting of Al, Cr—$Cr_xO_y$, Ti, TiN, and $TiN_xC_y$.

29. The liquid crystal light valve according to claim 23, wherein the third insulating layer has a thickness of 50 Å to 1000 Å.

30. The liquid crystal light valve according to claim 23, wherein the light-reflecting films have ends, and wherein the light shields are formed below the inside peripheral portions of the light-reflecting films at least 0.2 μm from the ends thereof.

31. The liquid crystal light valve according to claim 23, wherein the first, the second, and the third insulating layers contain at least one substance selected from the group consisting of $SiO_2$, $Si_3N_4$, $TaO_x$, $ZrO_x$, diamond carbon, and polyamide.

32. The liquid crystal light valve according to claim 31, wherein the first and the second insulating layers are formed from one substance selected from the group consisting of $SiO_2$, $Si_3N_4$, $TaO_x$, and $ZrO_x$.

33. The liquid crystal light valve according to claim 31, wherein the third insulating layer is formed from one substance selected from the group consisting of $Si_3N_4$, $TaO_x$, and $ZrO_x$.

34. A projection-type liquid crystal display device comprising:
 a light source;
 a projection lens; and
 a light valve, said light valve comprising:
  a plurality of light-reflecting films with one or more spaces therebetween;
  a semiconductor substrate connected electrically to the light-reflecting films;
  a counter substrate provided on an incident-light side thereof, liquid crystal disposed in a cell gap formed between the light-reflecting films and the counter substrate;
  counter electrodes provided on the counter-substrate;
  an electric circuit formed in the semiconductor substrate, which is configured to apply voltage to the light-reflecting films and the counter electrodes formed on the counter substrate;
  a light-blocking layer formed below the light-reflecting films;
  a first insulating layer formed between the light-blocking layer and the electric circuit;
  a second insulating layer formed between the light-reflecting films and the light-blocking layer;
  a stud which is configured to electrically connect the electric circuit and the light-reflecting films;
  light shields provided on the light-blocking layer formed below the light-reflecting films; and
  a third insulating layer formed between the light shields and the light-reflecting films;
  wherein at least one of said light shields and said light-blocking layer is configured to block the incident light from the electric circuit,
 the liquid crystal light valve according to claim 1.

35. A projection-type liquid crystal display device comprising:
 a light source;
 a projection lens; and
 a light valve, said light valve comprising:
  a plurality of light-reflecting films with one or more spaces therebetween, wherein said light-reflecting films have inside peripheral portions;
  a semiconductor substrate connected electrically to the light-reflecting films;
  a counter substrate provided on an incident-light side thereof;
  liquid crystal disposed in a cell gap formed between the light-reflecting films and the counter substrate;
  counter electrodes provided on the counter substrate;

an electric circuit formed in the semiconductor substrate, which is configured to apply voltage to the light-reflecting films and the counter electrodes formed on the counter substrate;

a light-blocking layer formed below the light-reflecting films;

a first insulating layer formed between the light-blocking layer and the electric circuit;

a second insulating layer formed between the light-reflecting films and the light-blocking layer;

a stud which is configured to electrically connect the electric circuit and the light-reflecting films;

light shields provided on the light-blocking layer formed below the inside peripheral portions of the light-reflecting films; and a third insulating layer formed between the light shields and the light-reflecting films;

wherein at least one of said light shields and said light-blocking layer are configured to block the incident light from the electric circuit.

36. A projection-type liquid crystal display device comprising:

a light source;

a projection lens; and a light valve, said light valve comprising:

a plurality of light-reflecting films with one or more spaces therebetween, wherein said light-reflecting films have inside peripheral portions;

a semiconductor substrate connected electrically to the light-reflecting films;

a counter substrate provided on an incident-light side thereof;

liquid crystal disposed in a cell gap between the light-reflecting films and the counter substrate;

an electric circuit formed in the semiconductor substrate, which is configured to apply voltage to the light-reflecting films and the counter electrodes formed on the counter substrate;

a light-blocking layer formed below the light-reflecting films;

a first insulating layer formed between the light-blocking layer and the electric circuit;

a second insulating layer formed between the light-reflecting films and the light-blocking layer;

a stud which is configured to electrically connect the electric circuit and the light-reflecting films;

light shields formed below the area including the inside peripheral portions of the light-reflecting films and the space between the light-reflecting films; and a third insulating layer formed between the light shields and the light-reflecting films;

wherein at least one of said light shields and said light-blocking layer is configured to block the incident light from the electric circuit.

37. A method for producing a liquid crystal light valve comprising:

(a) forming a semiconductor substrate, wherein said step of forming a semiconductor substrate comprises the sub-steps of:

(i) forming an electric circuit in the semiconductor substrate for a plurality of light-reflecting films;

(ii) forming a first insulating layer on the electric circuit;

(iii) forming a light-blocking layer on the first insulating layer;

(iv) boring a hole for a stud in the light-blocking layer;

(v) forming a second insulating layer on the light-blocking layer, wherein said second insulating layer has an upper surface;

(vi) boring a groove for a stud in the second insulating layer and the first insulating layer;

(vii) boring grooves for light shields in the second insulating layer;

(viii) forming a stud in the hole in the light-blocking layer and in the grooves in the first and the second insulating layers, said stud configured to electrically connect the light-reflecting films and the electric circuit, wherein said stud has an upper surface;

(ix) forming light shields on the light-blocking layer, which shields are configured to block incident light from a space between the light-reflecting films, wherein said light shields have an upper surface;

(x) forming a third insulating layer all over the upper surfaces of the second insulating layer, the stud, and the light shields;

(xi) removing the third insulating layer from the upper surface of the stud; and (xii) forming the plurality of light-reflecting films patterned for each electric circuit on the third insulating layer; and (b) forming a liquid crystal panel, wherein said step of forming a liquid crystal panel comprises the sub-steps of:

(i) aligning the semiconductor substrate and a counter substrate having a counter electrode; and (ii) filling liquid crystal in a cell gap formed by a spacer, said cell gap formed between the light reflecting films and the counter electrodes.

38. The method of claim 37, wherein said sub-steps (a)(vi) and (a)(vii) are performed substantially together, and wherein said sub-steps (a)(viii) and (a)(ix) are performed substantially together.

* * * * *

UNITED STATES PATENT AND TRADEMARK OFFICE
CERTIFICATE OF CORRECTION

PATENT NO. : 6,781,650 B1
DATED : August 24, 2004
INVENTOR(S) : E.G. Colgan et al.

It is certified that error appears in the above-identified patent and that said Letters Patent is hereby corrected as shown below:

Column 4,
Line 13, insert "." after the word "above"

Column 14,
Line 51, replace "," with -- . -- after the word "circuit"

Signed and Sealed this

Fourteenth Day of December, 2004

JON W. DUDAS
*Director of the United States Patent and Trademark Office*